US012288007B2

(12) United States Patent
Pratt et al.

(10) Patent No.: US 12,288,007 B2
(45) Date of Patent: Apr. 29, 2025

(54) SERVICE FOR TARGETED CROWD SOURCED AUDIO FOR VIRTUAL INTERACTION

(71) Applicant: AT&T Intellectual Property I, L.P., Atlanta, GA (US)

(72) Inventors: James Pratt, Round Rock, TX (US); Eric Zavesky, Austin, TX (US); Timothy Innes, Atlanta, GA (US); Nigel Bradley, McDonough, GA (US); Nikhil Marathe, Palatine, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 269 days.

(21) Appl. No.: 17/929,807

(22) Filed: Sep. 6, 2022

(65) Prior Publication Data

US 2023/0004343 A1    Jan. 5, 2023

Related U.S. Application Data

(63) Continuation of application No. 16/207,825, filed on Dec. 3, 2018, now Pat. No. 11,481,181.

(51) Int. Cl.
*G06F 17/00*    (2019.01)
*G06F 3/0484*    (2022.01)
(Continued)

(52) U.S. Cl.
CPC ............ *G06F 3/165* (2013.01); *G06F 3/0484* (2013.01); *G06T 19/006* (2013.01)

(58) Field of Classification Search
CPC .......... G06F 3/165; G06F 3/0484; G06F 3/11; G06T 19/006; H04R 5/02; H04R 5/027;
(Continued)

(56) References Cited

U.S. PATENT DOCUMENTS 8,060,225 B2    11/2011    Hans et al.
9,293,148 B2    3/2016    Herger et al.
(Continued)

FOREIGN PATENT DOCUMENTS

WO    2015/192130 A1    12/2015

OTHER PUBLICATIONS

Non-Final Office Action received for U.S. Appl. No. 16/207,825 dated Jan. 28, 2020, 19 pages.
(Continued)

*Primary Examiner* — Paul C McCord
(74) *Attorney, Agent, or Firm* — Guntin & Gust, PLC; Mark Wilinski

(57) ABSTRACT

An audio generation system is provided to enable coordinated control of multiple IoT devices for audio collection and distribution of one or more audio sources according to location and user preference. The audio generation system enables a location sensitive acoustic control of sound, both as a shaped envelope for a particular source, and as an individualized experience. The audio generation system also facilitates an interactive visual system for visualization and manipulation of the audio environment including via the use of augmented reality and/or virtual reality to depict soundscapes. The audio generation system can also facilitate a system for improving and achieving an audio environment (sound influence zone) and an intuitive way to understand where sounds will be heard.

20 Claims, 10 Drawing Sheets

(51) Int. Cl.
*G06F 3/16* (2006.01)
*G06T 19/00* (2011.01)

(58) Field of Classification Search
CPC ........ H04S 7/303; H04S 7/40; H04S 2400/13; H04S 2400/15
USPC .......................................................... 700/94
See application file for complete search history.

(56) References Cited

U.S. PATENT DOCUMENTS

| | | | |
|---|---|---|---|
| 9,729,984 | B2 | 8/2017 | Tan et al. |
| 9,774,907 | B1 | 9/2017 | Bhageria et al. |
| 9,794,719 | B2 | 10/2017 | Chandran et al. |
| 9,830,931 | B2 | 11/2017 | Butts et al. |
| 10,218,747 | B1 | 2/2019 | Monson et al. |
| 10,306,394 | B1 | 5/2019 | Zhu Jin et al. |
| 2006/0212147 | A1* | 9/2006 | McGrath ............... H04M 3/568 381/17 |
| 2008/0077261 | A1* | 3/2008 | Baudino ........... H04M 1/72412 700/94 |
| 2009/0222388 | A1* | 9/2009 | Hua ......................... G06N 5/02 382/103 |
| 2010/0202633 | A1 | 8/2010 | Kim et al. |
| 2011/0238751 | A1 | 9/2011 | Belimpasakis et al. |
| 2014/0079225 | A1 | 3/2014 | Jarske et al. |
| 2017/0309297 | A1 | 10/2017 | Arsikere et al. |
| 2018/0262551 | A1 | 9/2018 | Demeyer et al. |
| 2019/0394604 | A1 | 12/2019 | Van Laack et al. |

OTHER PUBLICATIONS

Final Office Action received for U.S. Appl. No. 16/207,825 dated Aug. 24, 2020, 28 pages.
Non-Final Office Action received for U.S. Appl. No. 16/207,825 dated Sep. 3, 2021, 26 pages.
Final Office Action received for U.S. Appl. No. 16/207,825 dated Mar. 16, 2022, 19 pages.

\* cited by examiner

SERVICE FOR TARGETED CROWD SOURCED AUDIO FOR VIRTUAL INTERACTION

RELATED APPLICATION

The subject patent application is a continuation of, and claims priority to, U.S. patent application Ser. No. 16/207,825, filed Dec. 3, 2018, and entitled "SERVICE FOR TARGETED CROWD SOURCED AUDIO FOR VIRTUAL INTERACTION," the entirety of which priority application is hereby incorporated by reference herein.

TECHNICAL FIELD

The disclosed subject matter relates to a dynamic audio system that provides coordinated control of disparate speakers for distribution of acoustic control of one or more audio sources.

BACKGROUND

In an Internet of Things (IoT) environment, there are no centrally controlled systems to enable personalized and defined audio experiences for a group of people in a defined area.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
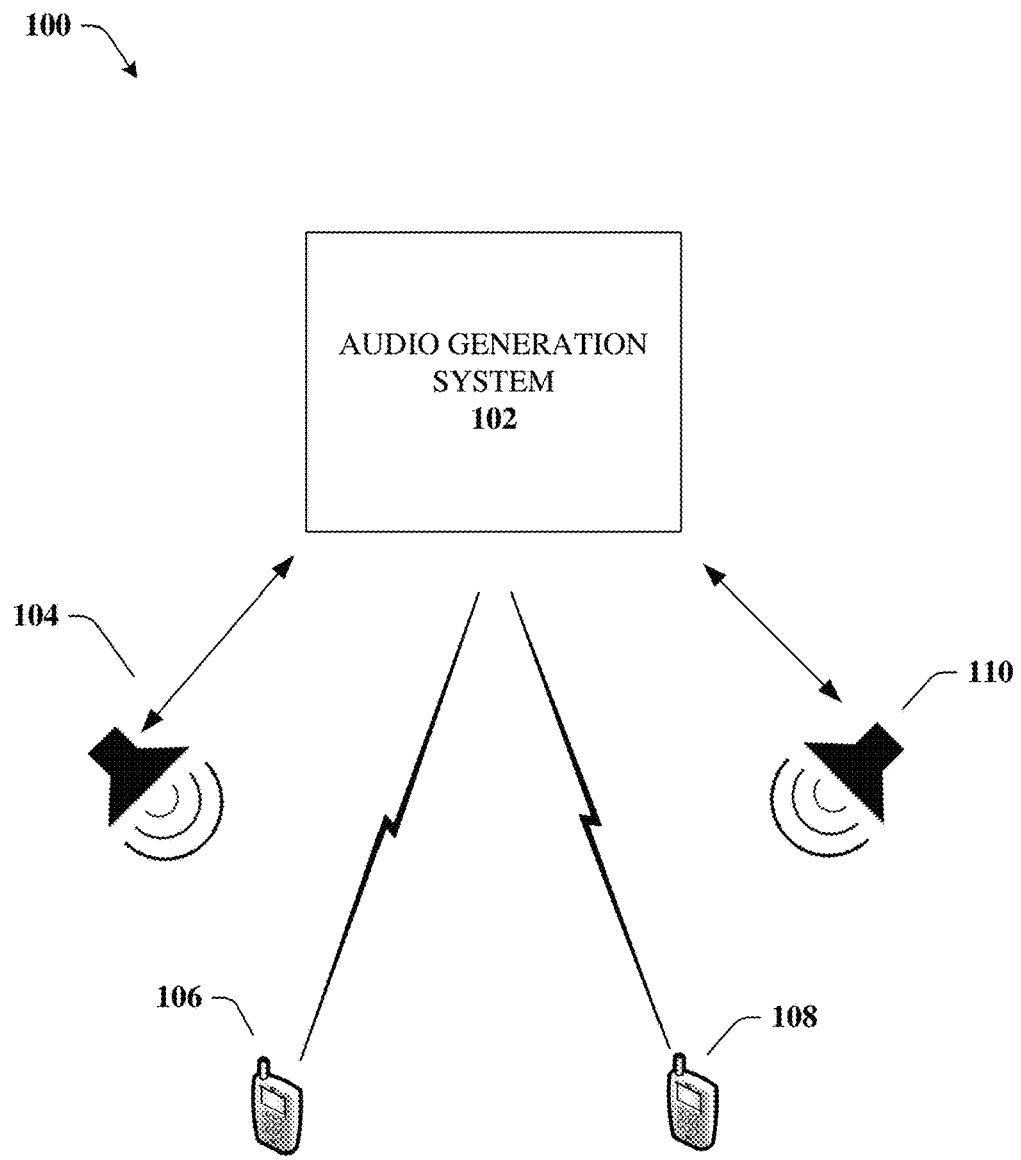
FIG. 1 illustrates an example schematic diagram of an audio generation system that can link with speaker device in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

An audio generation system is provided to enable coordinated control of multiple IoT devices for audio collection and distribution of one or more audio sources according to location and user preference. The audio generation system enables a location sensitive acoustic control of sound, both as a shaped envelope for a particular source, and as an individualized experience. The audio generation system also facilitates an interactive visual system for visualization and manipulation of the audio environment including via the use of augmented reality and/or virtual reality to depict soundscapes. The audio generation system can also facilitate a system for improving and achieving an audio environment (sound influence zone) and an intuitive way to understand where sounds will be heard.

To at least these and related ends, an audio generation system can comprise a processor and a memory that stores executable instructions that, when executed by the processor, facilitate performance of operations, comprising facilitating pairing a first audio signal generator device with the audio generation system. The operations can also comprise generating a first audio signal as a function of an audio parameter of the first audio signal generator device, an audio program associated with the audio generation system, and an audio output of a second audio signal generator device within a predefined distance from the first audio signal generator device. The operations can also comprise transmitting the first audio signal to the first audio signal generator device to facilitate playback of the first audio signal by the first audio signal generator device.

In another embodiment, a method can comprise connecting, by a first audio signal generation device comprising a processor, a group of speaker devices to facilitate playback of an audio program via the group of speaker devices. The method can also comprise determining, by the first audio signal generation device, respective audio signals associated with the group of speaker devices, wherein an audio signal of the respective audio signals is based on an audio parameter of a speaker device associated with the audio signal, the first audio signal generator device, an audio file, and an audio output of a second audio signal generator device within a predefined distance from the first audio signal generator device. The method can also comprise transmitting, by the first audio signal generation device, the respective audio signals to the group of speaker devices.

In another embodiment, a machine-readable storage medium, comprising executable instructions that, when executed by a processor of an audio generation device, facilitate performance of operations. The operations can comprise establishing a wireless communication channel from the audio generation device to a speaker device that facilitates playback of an audio signal at the speaker device that is generated by the audio generation device. The operations can also comprise generating a first audio signal at the audio generation device based on a function of an audio parameter of the first speaker device, an acoustic model of an area associated with the first speaker device, and an audio output of a second speaker device within a predefined distance from the first speaker device. The operations can also comprise transmitting the first audio signal to the first speaker device to facilitate playback of the first audio signal.

In an embodiment, audio generation system can join different audio sources (digital or live) with audio sound generators (ASGs). In an embodiment, the audio sound generators can be selected from internet of thing devices, can comprise mobile devices, and other purpose built distributed speaker systems. The control mechanism is shared among a set of devices via mesh (or central) distribution to facilitate acoustic amplification and cancellation with user-defined spatial limitations. These goals are achieved with the following core contributions: (1) opportunistic harnessing of proximal devices to jointly amplify, suppress, and create true 3D audio; (2) XR visualization and interaction for simple control of audio zones and signals, XR includes augmented reality, virtual reality and other enhanced reality visualization systems; and (3) prediction and guidance for possible/optimal audio experience.

In an embodiment, the audio generation system can enable the distributed collaboration of unlike devices to achieve purpose and action and amplify and dampen various audio sources opportunistically using proximal devices. The audio generation system can also enable privacy controls for audio—amplification and monitoring to avoid abuse of invention and amplification technology for undesired monitoring and supervision. The audio generation system can also enable organic XR visualization by providing visualization cues for direction, focus, range, that communicates human desire to machine logic and vice versa. The XR visualization can also provide a prediction of what is possible. In other embodiments, the XR visualization can enable error correction and experience improvement guidance to allow direction or profiling as to where physically one would need to travel to in order to attain the acoustic environment that is desired.

Turning now to FIG. 1, illustrated is an example schematic diagram 100 of an audio generation system 102 that can link with speaker devices in accordance with various aspects and embodiments of the subject disclosure.

The audio generation system 102 can be a cloud based system that uses a Software as a Service model or similar distributed system. In other embodiments, the audio generation system 102 can be operated by a mobile network and operate off of one or more servers in the network infrastructure. In other embodiments, the audio generation system 102 can operate as an application or service on one or more mobile devices. In other embodiments, the audio generation system 102 can operate via a mesh network between devices 104, 106, 108, and 110, or can be centrally located. When operating on a mobile device, the audio generation system 102 can communicate and coordinate with other mobile devices that are operating other audio generation systems. It is to be appreciated that while in FIG. 1, the audio generation system 102 is shown outside of the mobile devices 106 and 108, in other embodiments, as described herein, the audio generation system 102 can operate as an application or service on mobile devices 106 or 108.

In an embodiment, audio generation system 102 can connect to one or more of devices 104, 106, 108, and 110 in order to stream audio signals to the devices for playback by the device. Devices can include mobile device (e.g., devices 106 and 108) or generic speakers or audio signal generators (e.g., 104 and 110) or other devices capable of wireless transmission and sound generation. The audio generation system 102 can stream the same audio signal from a common audio file to each of the devices or can stream disparate audio signals to the devices to provide common or disparate audio environments for an area around each device. The audio signal streamed to the devices can be based on one or more user profiles (e.g., pitch, volume, timbre, and other audio parameters set based on preference data associated with the file) in order to provide customized acoustic environments.

In an embodiment, the audio generation system 102 can connect to the speakers in response to sending out a beacon signal. The devices can respond with a confirmation signal that they are ready to link to establish the communication channel. In an embodiment, the devices can be passively joined or can be joined in response to a user accepting to join by confirming the connection request. In an embodiment, the audio generation system 102 can scan for devices within a predefined proximity, or by detecting beacon signals emitted by one or more of the devices.

In an embodiment, the audio generation system 102 can also construct an acoustic model of the area around the speakers and devices 104, 106, 108, and 110. In an embodiment, the audio generation system 102 can generate a known baseline audio signal that one or more of speakers 104, 106, 108 or 110 can playback. Microphones on any of the other device can pick up the acoustic sound waves that come directly from the speakers as well as reflect off of the surrounding surfaces. Based on the reflections, the audio generation system 102 can generate an acoustic model of the area that can predict how acoustic signals will sound at various places in the room. In other embodiments, the audio generation system 102 can generate the acoustic model based on analysis of an image or set of images or video. Objects can be identified, the room shape can be determined, and other factors can be determined, to assist in generating the acoustic model.

In an embodiment, the audio generation system 102 can generate the acoustic model based on any of the speakers/devices 104, 106, 108, or 110 playing back the baseline audio signal while microphones on an of the device can be moved around the room or area. In other embodiments, the audio generation system 102 can continuously or dynamically update the acoustic model based on changing conditions in the room or area. The audio generation system 102 can generate a baseline signal continuously or periodically that can be played back concurrently by the speakers with the main audio content, and based on changing conditions (e.g., weather, larger or smaller room, number of people in room/area, etc) the audio generation system 102 can adjust the acoustic model.

It is to be appreciated that while FIG. 1 shows two speakers, and two mobile devices, in other embodiments, the audio generation system 102 can connect to a plurality of mobile devices.

Figure 2:
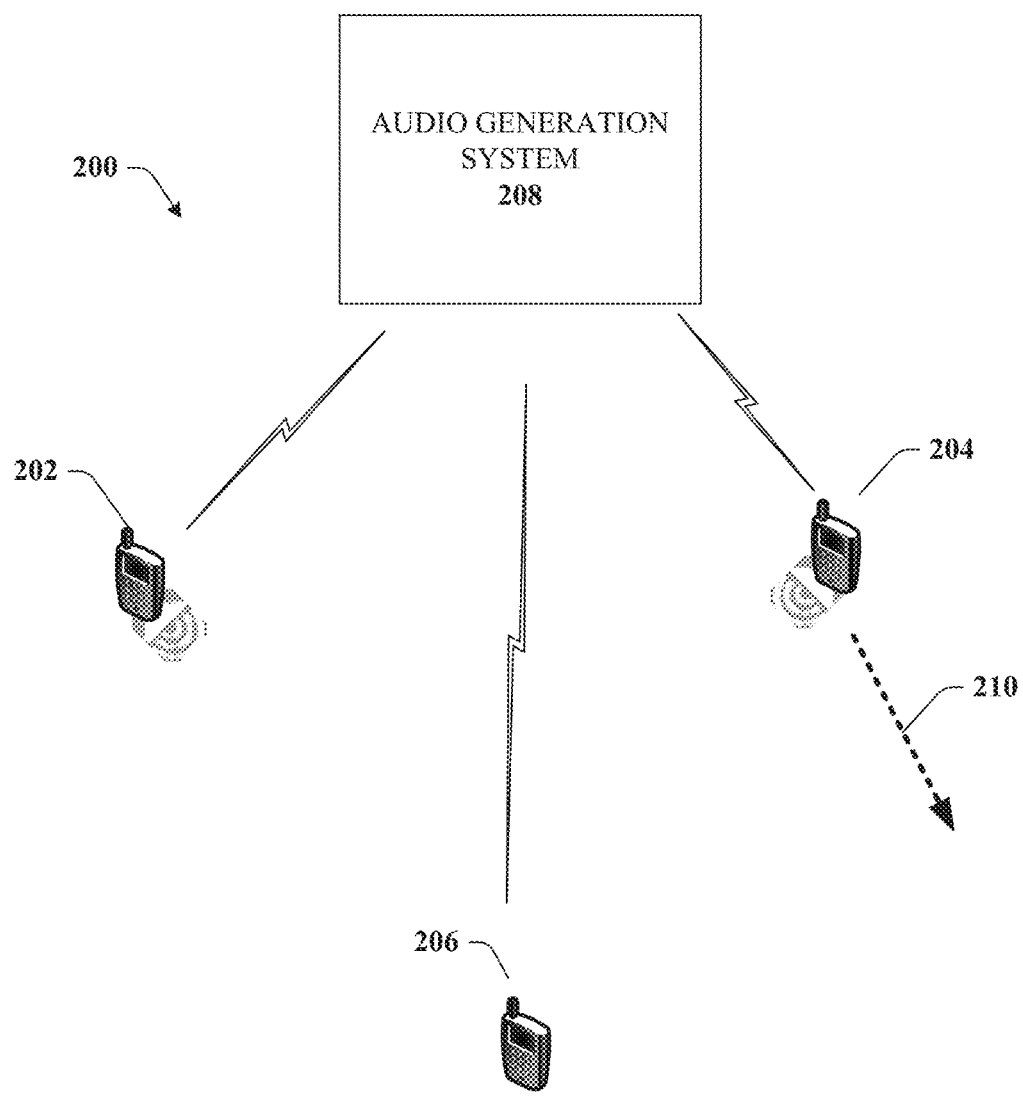
FIG. 2 illustrates an example schematic diagram of an audio generation system that can calibrate speaker output based on movement of a speaker in accordance with various aspects and embodiments of the subject disclosure.

Turning now to FIG. 2, illustrated is an example schematic diagram 200 of an audio generation system 208 that can calibrate speaker output based on movement of a speaker 204 in accordance with various aspects and embodiments of the subject disclosure.

Not only can the audio generation system 208 calibrate and adjust speakers due to the movement of a listener associated with a mobile device by tracking the movement of the mobile device, but the audio generation system 208 can also track the movement and location of a speaker 204 that moves while a mobile device 206 associated with a listener stays still (as shown in FIG. 2) or moves in other embodiments.

In the embodiment shown in FIG. 2, speakers 202 and 204 can be speakers that are part of a mobile device. The audio generation system 208 can use a distributed speaker system composed of dedicated mobile devices, or can use mobile devices associated with other users in the room or area in which the audio content is being played back. In that embodiment, the area and/or audio generation system 208 may not have dedicated speakers, but uses whatever speakers are available on mobile devices and other personal devices that are nearby. Users can opt-in on their mobile devices before the audio generation system 208 sends audio signals to the mobile devices associated with speakers 202 and 204 to play back the audio content. In other embodiments, the audio generation system 208 can have a mix of dedicated speakers not part of mobile devices, and speakers that are on mobile devices.

In an embodiment, audio generation system 208 can determine a location of speaker 202 and 204. The speakers' position can be known beforehand, or can be determined by the audio generation system 208 based on sensor information, network location information received from a mobile network, or location information received from the speakers 202 and 204. For instance, if an audio playback is being performed in a room, the room can have one or more video cameras, motion sensors, IR detectors, magnetometers, NFC devices, and etc., which can track the location and movement of the mobile device 106.

In an embodiment, the audio generation system 208 can determine that speaker 204 is moving in the direction of the arrow 210 and calibrate and/or adjust the audio signals sent to speakers 202 and 204 to provide a calibrated listening experience for the user associated with mobile device 206. The audio generation system 208 can adjust the phase of the audio signals and the volume and other acoustical attributes to adjust for the relative differences in distance of the mobile device 206 from each of speakers 202 and 204.

In an embodiment, the audio generation system 208 can adjust the audio signals sent to speakers 202 and 204 such that the aural experience at the mobile device 206 remains that same at the beginning of the playback of the audio as at the end, regardless of the movement of speaker 204. In other embodiments, the audio signal(s) can be adjusted so that the listening experience (perceived volume, spatial positioning of the sound, and etc) matches a predetermined criterion (e.g., that established by the user associated with mobile device 206, or established by a content creator).

Figure 3:
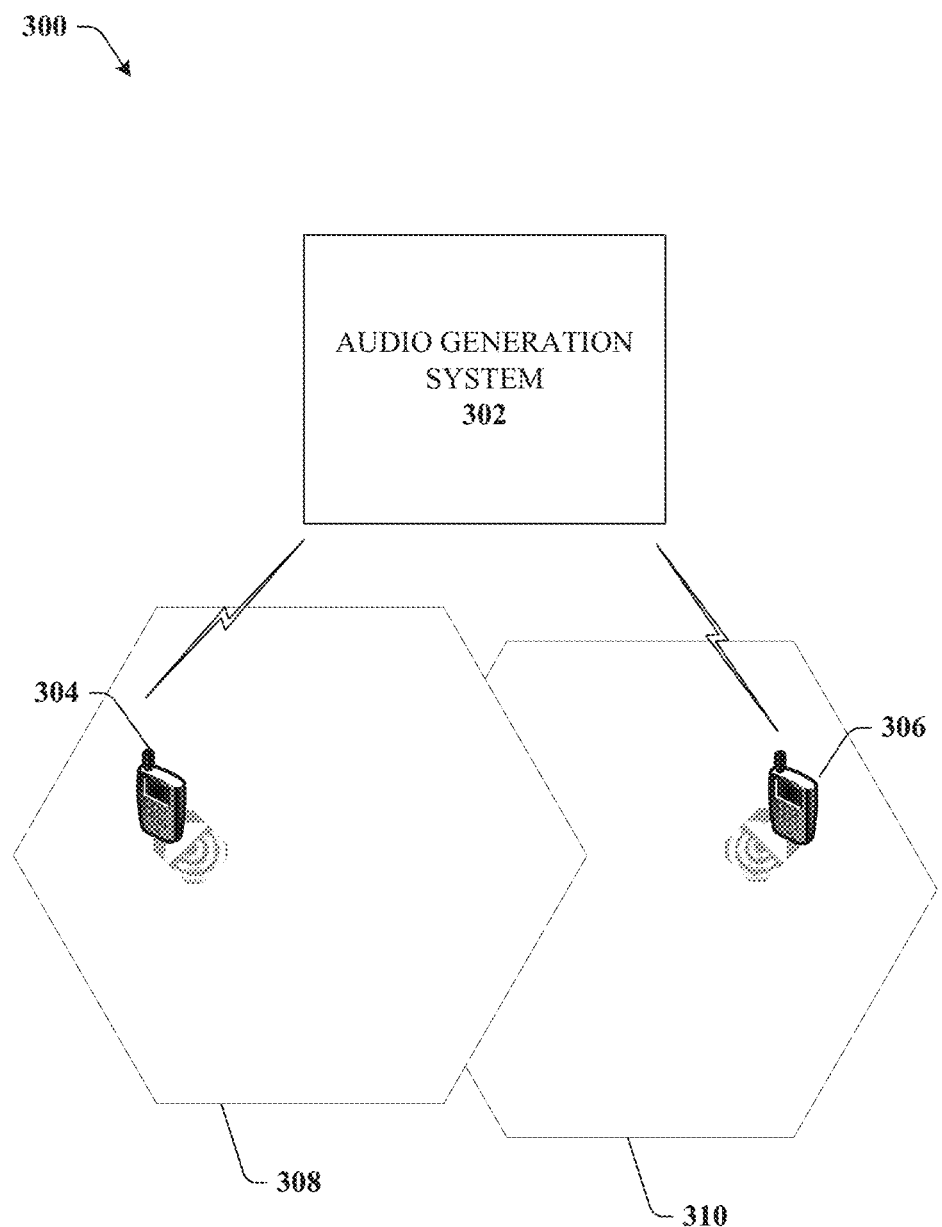
FIG. 3 illustrates an example schematic diagram of an audio generation system that can provide different audio experiences for different zones in accordance with various aspects and embodiments of the subject disclosure.

Turning now to FIG. 3, illustrated is an example schematic diagram 300 of an audio generation system 302 that can provide different audio experiences for different zones in accordance with various aspects and embodiments of the subject disclosure.

In an embodiment, audio generation system 302 can generate audio signals to provide customized acoustic environments in different zones 308 and 310. The audio signals can be transmitted wirelessly to mobile devices 304 and 306 to facilitate playback of the audio signal in the zones 308 and 310 respectively. The audio signals can correspond to a common event e.g., a speech, play, movie, or other event, with the audio of the event being streamed to each device. The audio generation system 302 can customize the audio signal based on preference data associated with the mobile devices 304 or 306 or based on configuration data received from the mobile devices. The preference data can include configuration information for one or more parameters including volume, pitch, playback speed, and other parameters.

In an embodiment, the audio signals can be configured such that the playback of the audio signals causes destructive or constructive interference with the playback of another device in order to preserve the customized sound environment in each zone 308 and 310. As an example, if preference information associated with zone 308 or device 304 indicates a lower volume preference than that of device 306 or zone 310, the audio signal sent to device 304 can be configured to cause interference in zone 308 to mute or muffle the sound coming from device 306 in zone 306.

This interference can also enable the devices to be streamed disparate audio signals corresponding to different audio sources, files, or disparate events and due to the interference, each of the zones can be set up such that listeners in the respective zones cannot hear the audio being played back by devices in other zones. In other embodiments, the interference can be configured to be constructive interference, boosting the volume of the audio playback in a zone. Microphones on each of the devices and other connected devices can also be used to record the sound in each zone, and then audio generation system 302 can use the recorded sound to analyze and determine how to configure the audio signals for each device 304 and 306.

Various settings on the devices can be used to configure whether the zone should be a private zone, thus limiting the ability of a listener in zone 310 from hearing what is in zone 308, or whether the zone should be a public zone. These settings can be entered by the devices, the preference information can then be transmitted by the device to the audio generation system 302 which can then implement the preferences.

In other embodiments, whether a zone is private or public, whether it cancels out noise coming from other zones, and other settings can be based on preferences associated with the audio source. As an example, if a speaker is making an speech, and the speech audio is being streamed to devices 304 and 306, there may be times when the speaker desires that the zones are private so that listeners can hear the speaker, and at other times, the speaker may prefer the zones be public so that listeners in the zones 308 and 310 can hear the clapping and roar of the crowd from the other zones.

The size of the zones can be variable depending on preference data associated with the audio source, or based on preference data associated with the devices 304 and 306, or based on a number and density of linked devices.

Figure 4:
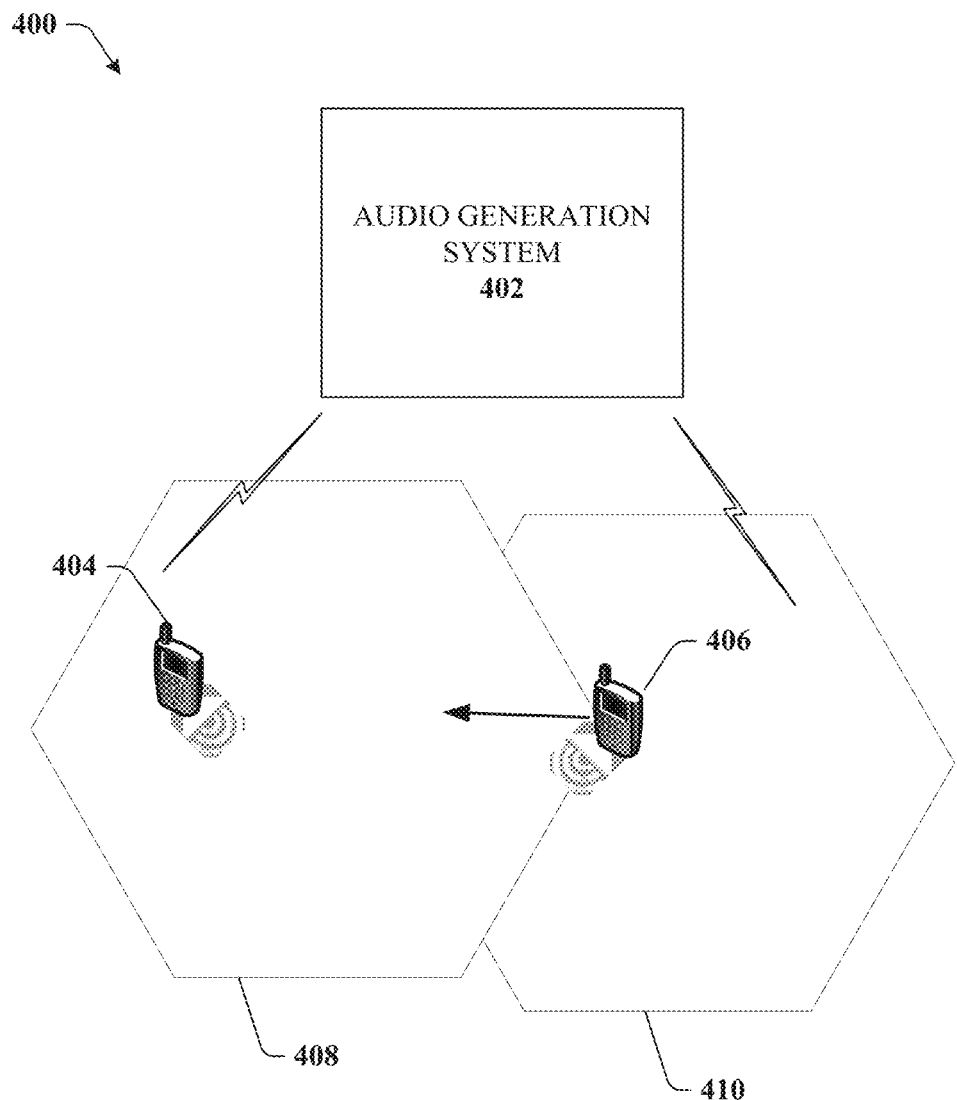
FIG. 4 illustrates an example schematic diagram of an audio generation system that can provide different audio experiences for different zones in accordance with various aspects and embodiments of the subject disclosure.

Turning now to FIG. 4, illustrated is an example schematic diagram of an audio generation system that can provide different audio experiences for different zones in accordance with various aspects and embodiments of the subject disclosure.

In an embodiment, the audio generation system 402 that can track the locations of devices 404 and 406. In an embodiment, audio generation system 402 can be streaming audio signals to each of devices 404 and 406 for playback in zones 408 and 410 respectively, but as audio generation system 402 determines that device 406 is crossing into zone 408, audio generation system 402 can either switch streaming of the audio signals to device 406 and cease streaming to device 404, or vice versa, or otherwise modify the audio signals to reflect the movement and new positions of devices 404 and 406.

Figure 5:
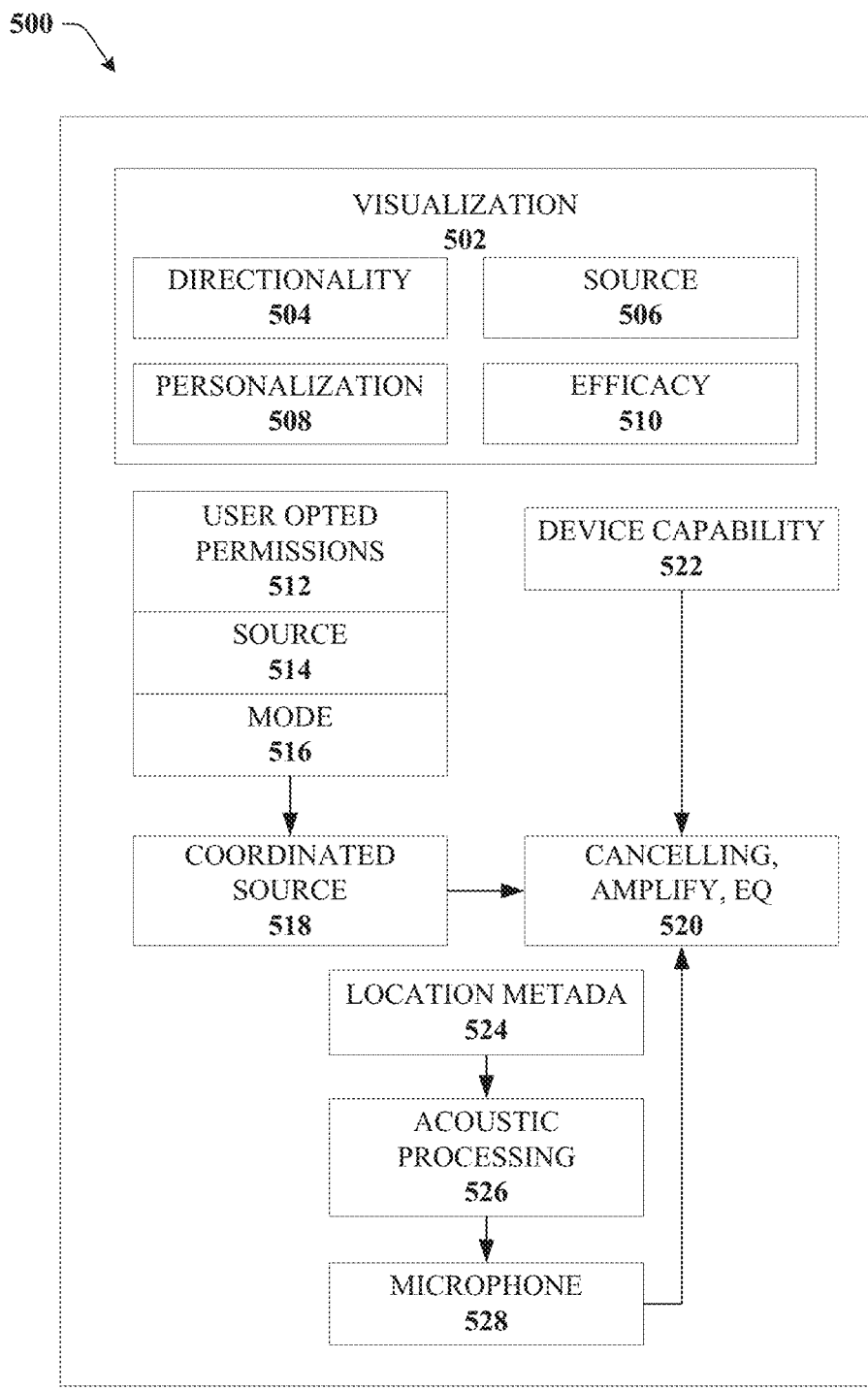
FIG. 5 illustrates an example schematic diagram of a visualization system in accordance with various aspects and embodiments of the subject disclosure.

Turning now to FIG. 5, illustrated is an example schematic diagram 500 of a visualization system 502 in accordance with various aspects and embodiments of the subject disclosure. The visualization system 502 can enable simple control of the audioscape by one or more of the devices playing back the audio or by a central controller. The visualization system 502 can also depict via augmented reality or virtual reality or other visualization scheme the audio zones, devices playing back sound, as well as providing controls and other systems to manipulate the audio playback per zone, or per group of zones.

The visualization system 502 can enable visualization of audio sources (by directionality and amplitude), both for the selection of audio sources to participate with, as well as understanding of device optimal position to contribute to the experience. The visualization system 502 can also enable interactive manipulation of the system and visualization with a TV guide like display of isolated audio sources that users can scroll through as entertainment or as a decision making tool of which to contribute their resources to.

In an embodiment, the visualization system 502 can take into account the directionality 504 and location of various audio sources 506 and display the personalization settings 508 associated with playback of the one or more audio sources 506. The visualization system 502 can also predict the efficacy 510 of the audio sources based on the directionality, location, and other personalization settings of the sources.

The user opted permissions 512, user selected sources 514 and the selected mode 516 (e.g., orator, private, emergency) can also be visually depicted and can contribute to the coordination of the sources 518. The cancellation, amplification and other effects shown at 520 can also take into account not just the coordinated sources, but also the device capabilities 522 of each of the linked audio sound generators. Location metadata 524 associated with the devices, the acoustic processing performed 526, and input received from the microphone 528 can also be used to depict the cancellation, amplification and equalization at 520.

Figure 6:
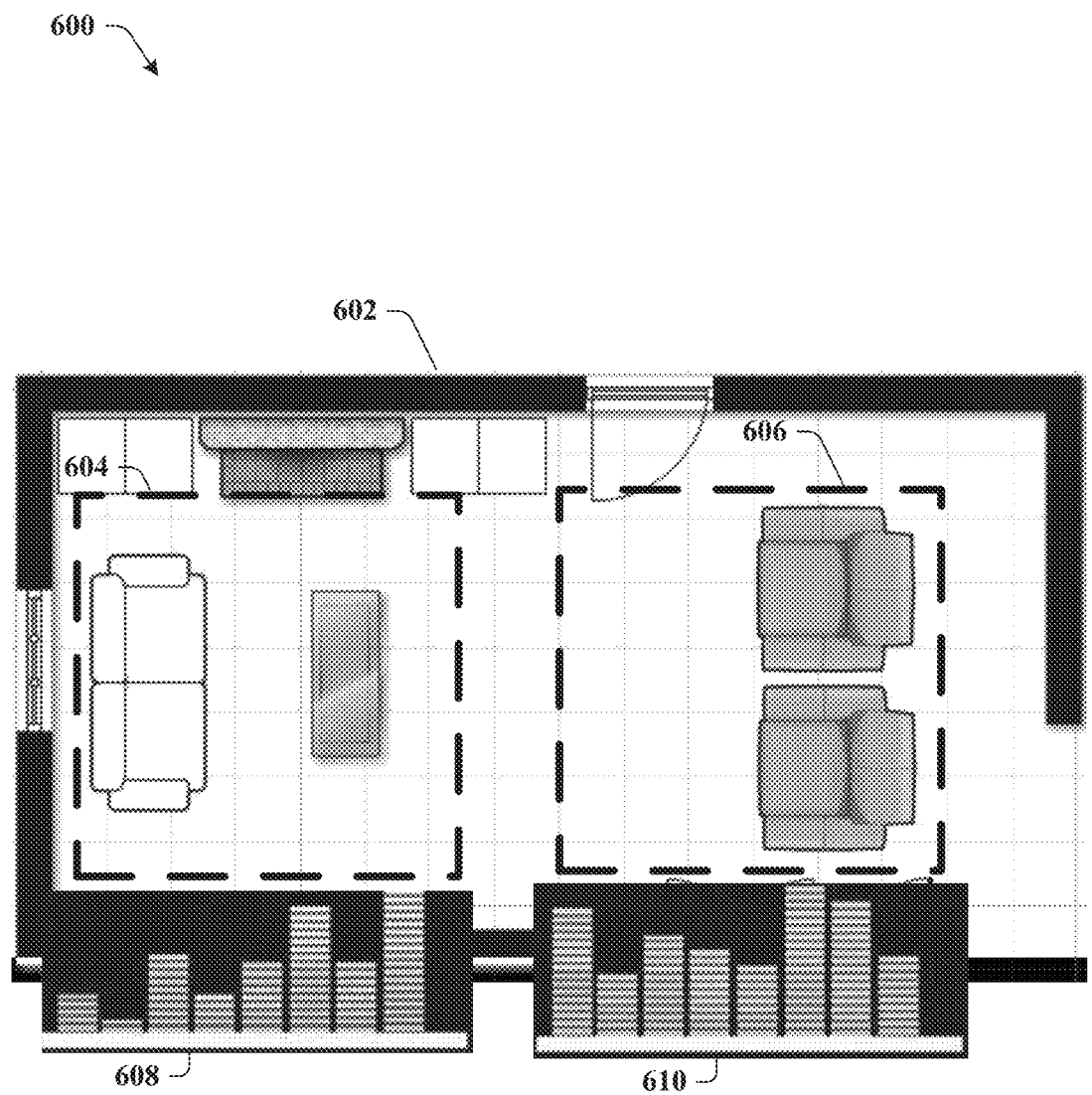
FIG. 6 illustrates an example schematic diagram of a visualization system in accordance with various aspects and embodiments of the subject disclosure.

Turning now to FIG. 6, illustrated is an example schematic diagram 600 of a visualization system in accordance with various aspects and embodiments of the subject disclosure.

The visualization provided by the visualization system 502 in FIG. 5 can be an augmented reality or virtual reality depiction with overlays over an image of an area in order to visualize the soundscape. As an example, in FIG. 6, a room 602 can be divided into two different zones 604 and 606 and the zone markings/boundaries can be shown in the visualization for ease of reference. The overlay can also include equalizer information (e.g., 608 and 610) for the respective zones 604 and 606. Other information such as the type of audio source selected in each zone, volume, directionality, location of the speakers, and other audio parameters can also be shown in the visualization. The visualization can also include controls and an interface to enable manipulation of the audio sources and audio signals transmitted to the speakers, as well as controls to manipulate the zones, including size and location.

Figure 7:
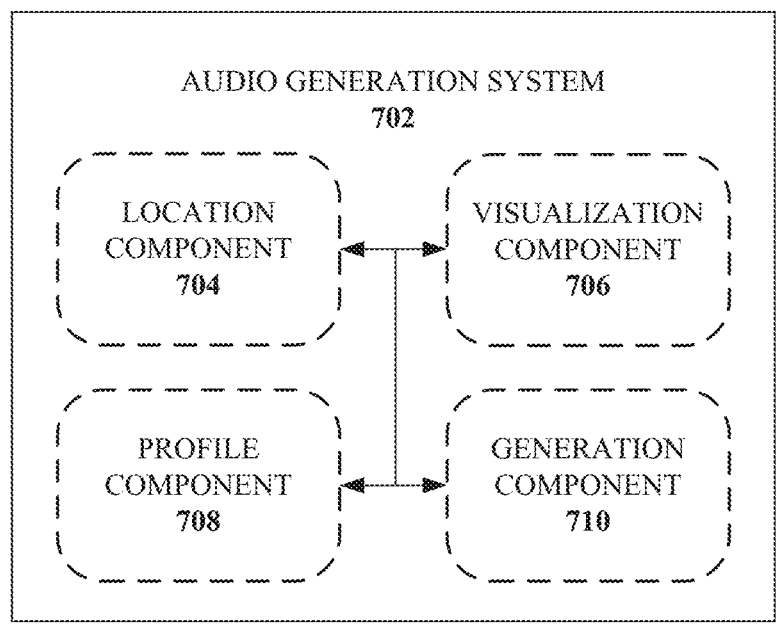
FIG. 7 illustrates an example schematic diagram of an audio generation system in accordance with various aspects and embodiments of the subject disclosure.

Turning now to FIG. 7, illustrated is an example schematic diagram 700 of an audio generation system 702 in accordance with various aspects and embodiments of the subject disclosure.

A profile component 708 can be present to obtain profile data representative of an audio profile of preference information of a user identity associated with the mobile device, wherein the preference information indicates a preference for an aural element of an audio playback of audio data. A generation component 710 can be present to generate an audio signal for the speaker based on the audio profile, the first location of the speaker and the second location of the mobile device, wherein the audio signal being rendered by the speaker is to create an aural experience at the second location that corresponds to the aural element of the audio playback.

The location component 704 can track the location of one or more mobile devices based on location information received from the mobile devices. The mobile devices can send coordinates (e.g., determined via GPS on the mobile device). In other embodiments, the location component 704 can determine the location of the mobile devices based on a location determined by a mobile network associated with the mobile devices. In other embodiments, one or more sensors associated with the speakers or other devices in an area near the mobile devices can track the location of audio generation system 702 within the area. For instance, if an audio playback is being performed in a room, the room can have one or more video cameras, motion sensors, IR detectors, magnetometers, NFC devices, Wi-Fi antennas, and etc., which can track the location and movement of the mobile devices.

The profile component 708 can determine preference data from a sound profile associated with the mobile devices. The sound profiles can contain preferences relating to the pitch, timbre, volume/intensity, reverb, and etc., of audio played back. The generation component 710 can thus modulate an audio signal associated with the audio content and generate personalized audio signals for each speaker.

The sound profiles can also contain preferences relating to one or more filters that may further adjust the audio signal beyond the physical characteristics relating to frequency and intensity. The filters can relate to one or more effects that can affect the mood or other attribute of the audio. For instance, a listener associated may prefer music or audio to sound like warmer, and so the profile component 708 can apply a filter to adjust the audio signal based on the preferences. Likewise, a listener can prefer to have amplified voices relative to sound effects or music, and so profile component 708 can isolate vocal sources in the audio and increase the intensity of those sources to provide amplified vocal sounds in the audio signal sent to speaker.

A visualization component 706 can be provided to enable a visualization and interactive map showing the soundscape of each of the connected speakers and devices, as well as the audio sources, and location and directionality thereof. The visualization component 706 can provide a mechanism to enable manipulation and control of the audio generation system 702, and generation component 710 can adjust the audio signals to each of the devices based on the input received via the visualization component 706.

Figure 8:
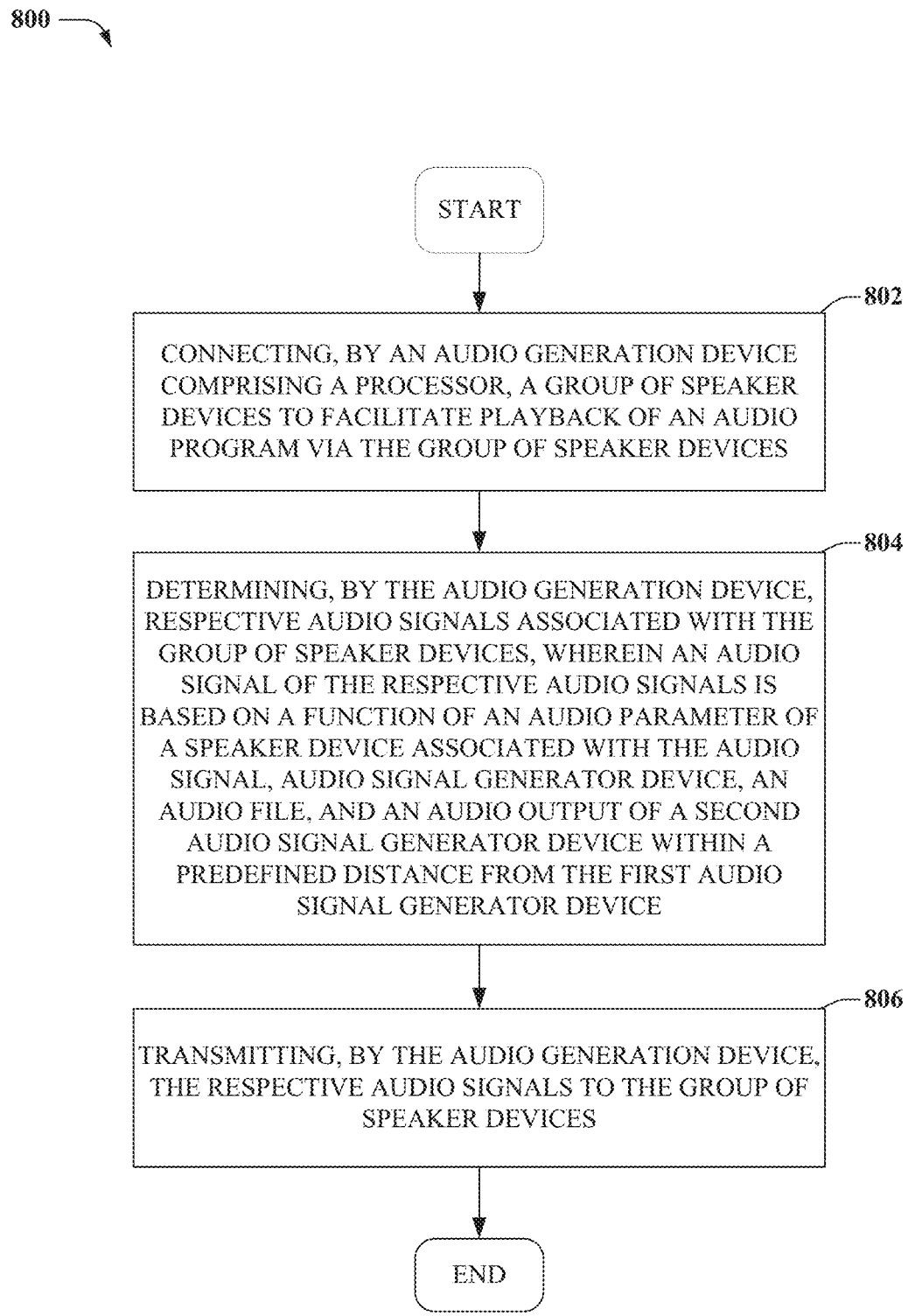
FIG. 8 illustrates an example method for providing a customized dynamic audio experience in accordance with various aspects and embodiments of the subject disclosure.

FIG. 8 illustrates a process in connection with the aforementioned systems. The process in FIG. 8 can be implemented for example by the systems in FIGS. 1-7 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Turning now to FIG. 8, illustrated is an example method 800 for providing a customized dynamic audio experience in accordance with various aspects and embodiments of the subject disclosure.

The method can start at 802, where the method comprises connecting, by a first audio signal generation device comprising a processor, a group of speaker devices to facilitate playback of an audio program via the group of speaker devices At 804, the method comprises determining, by the first audio signal generation device, respective audio signals associated with the group of speaker devices, wherein an audio signal of the respective audio signals is based on an audio parameter of a speaker device associated with the audio signal, the first audio signal generator device, an audio file, and an audio output of a second audio signal generator device within a predefined distance from the first audio signal generator device.

At 806, the method comprises transmitting, by the first audio signal generation device, the respective audio signals to the group of speaker devices.

Figure 9:
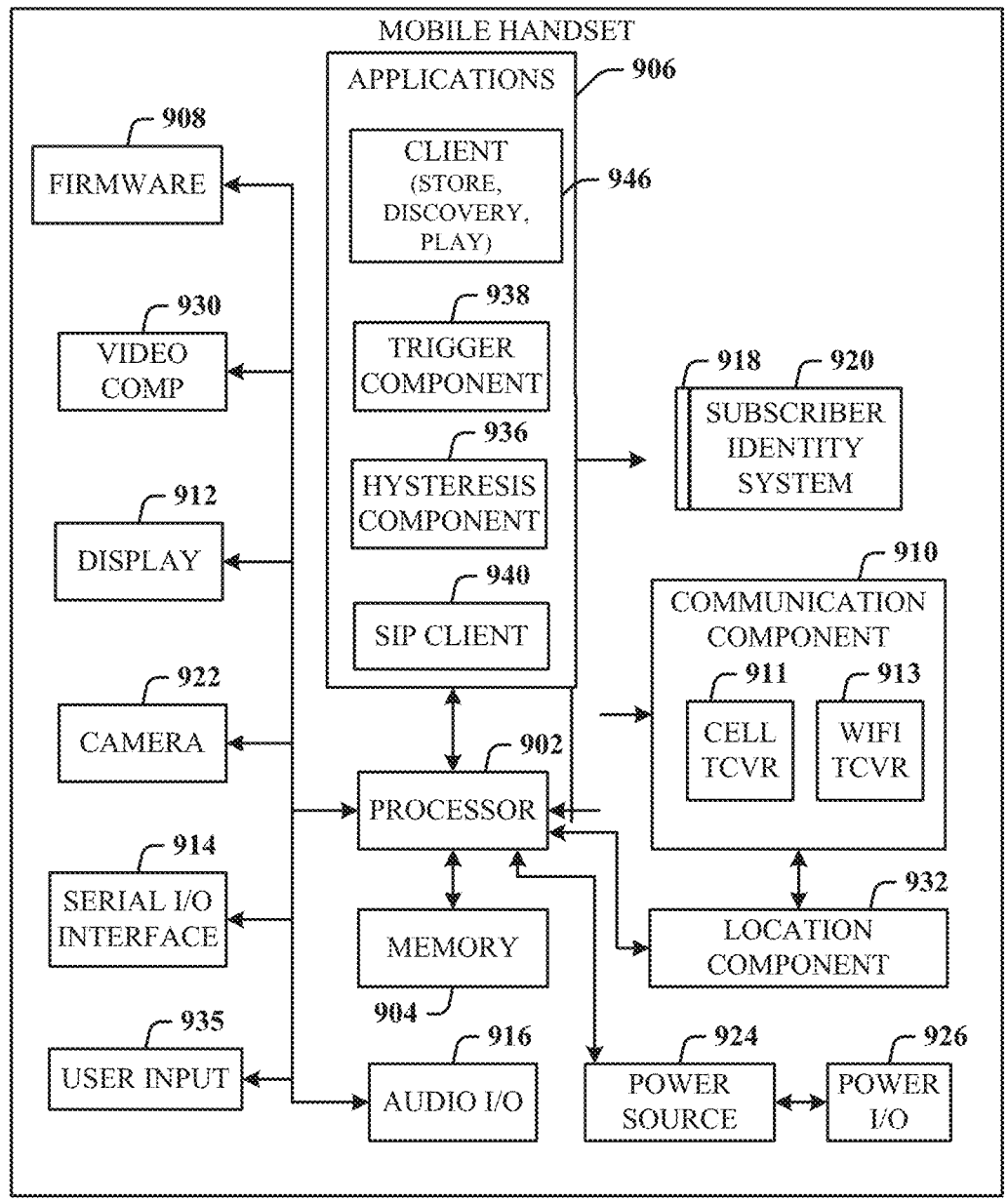
FIG. 9 illustrates an example block diagram of an example user equipment operable to provide an audio generation system in accordance with various aspects and embodiments of the subject disclosure.

Referring now to FIG. 9, illustrated is a schematic block diagram of an example end-user device such as a user equipment (e.g., mobile device 106, 206, 306, or 502) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description comprises a general context of computer-executable instructions embodied on a machine-readable storage medium, those skilled in the art will recognize that the innovation also can be implemented in combination with other program modules and/or as a combination of hardware and software.

Generally, applications (e.g., program modules) can comprise routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically comprise a variety of machine-readable media. Machine-readable media can be any available media that can be accessed by the computer and comprises both volatile and non-volatile media, removable and non-removable media. By way of example and not limitation, computer-readable media can comprise computer storage media and communication media. Computer storage media can comprise volatile and/or non-volatile media, removable and/or non-removable media implemented in any method or technology for storage of information, such as computer-readable instructions, data structures, program modules or other data. Computer storage media can comprise, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be comprised within the scope of computer-readable media.

The handset 900 comprises a processor 902 for controlling and processing all onboard operations and functions. A memory 904 interfaces to the processor 902 for storage of data and one or more applications 906 (e.g., a video player software, user feedback component software, etc.). Other applications can comprise voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also comprise a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 comprises a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can comprise a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can comprise a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also comprises a power source 924 in the form of batteries and/or an AC power subsystem, which power source 924 can interface to an external power system or charging equipment (not shown) by a power I/O component 926.

The handset 900 can also comprise a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can comprise such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also comprise a client 942 that provides at least the capability of discovery, play and store of multimedia content, for example, music.

The handset 900 can comprise an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
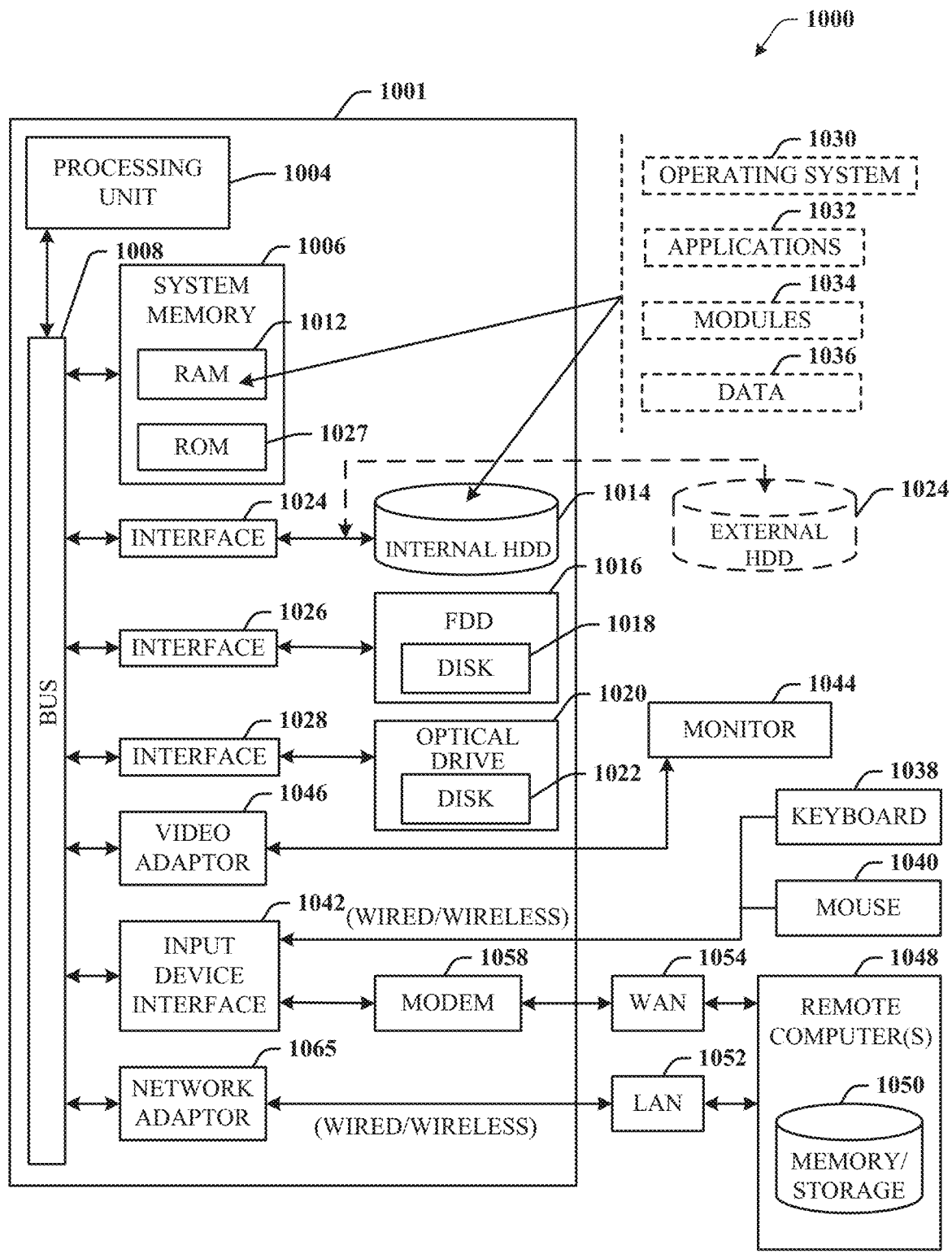
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a cloud component or service (e.g., audio generation system described herein) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference to FIG. 10, implementing various aspects described herein with regards to the end-user device can comprise a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also comprise a high-speed RAM such as static RAM for caching data.

The computer 1000 further comprises an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations comprises at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may comprise a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically comprises other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically comprises many or all of the elements described relative to the computer, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also comprise a wireless access point disposed thereon for communicating with the wireless adapter 1056.

When used in a WAN networking environment, the computer 1000 can comprise a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," "tation," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "comprises" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:

dividing, by a system comprising a processor, a defined area comprising a group of individuals into a group of zones; and generating, by the system, via audio output devices, a customized audio output based on a voice input from a human presenter associated with speech being presented to a crowd of human attendees in the defined area, wherein the customized audio output comprises:

during first portions of the speech when the human presenter is speaking, a first customized audio output that makes respective zones of the group of zones private to suppress noise from the crowd of human attendees of other zones of the group of zones other than the respective zones, during second portions of the speech when the human presenter is not speaking, a second customized audio output that makes the respective zones of the group of zones public to allow the noise from the crowd of human attendees of the other zones of the group of zones to be heard in the respective zones, and during third portions of the speech when the human presenter is speaking, a third customized audio output and a fourth customized audio output, wherein the third customized audio output is provided to a first speaker of a first mobile device of a zone included in the group of zones based on a determination that the first speaker is moving, wherein the fourth customized audio output is provided to a second speaker of the zone based on the determination that the first speaker is moving, and wherein an aural experience at a second mobile device of the zone remains the same for a duration of the third portions of the speech based on the third customized audio output and the fourth customized audio output.

2. The method of claim 1, wherein the generating of the customized audio output comprises generating the customized audio output further based on an acoustic model of the defined area.

3. The method of claim 1, wherein the generating of the customized audio output comprises generating the customized audio output further based on constructive interference associated with respective audio outputs of the audio output devices.

4. The method of claim 1, wherein the generating of the customized audio output comprises generating the customized audio output further based on destructive interference associated with respective audio outputs of the audio output devices.

5. The method of claim 1, wherein the generating of the customized audio output comprises generating the customized audio output further based on respective locations of the audio output devices in the defined area.

6. The method of claim 1, further comprising selecting, by the system, sizes for the respective zones based on preference data associated with the human presenter.

7. The method of claim 1, further comprising selecting, by the system, sizes for the respective zones based on a quantity of mobile devices associated with the human attendees in the defined area.

8. A system, comprising:
a processor; and
a memory that stores executable instructions that, when executed by the processor, facilitate performance of operations, comprising:
dividing a defined area comprising a group of individuals into a group of zones; and
generating, via audio output devices, a tailored audio output based on a voice input from a human performer associated with a performance being presented to a crowd of people in the defined area, wherein the tailored audio output comprises:
during first portions of the performance when the human performer is generating sound, a first tailored audio output that makes respective zones of the group of zones private to suppress noise from the crowd of people of other zones of the group of zones other than the respective zones,
during second portions of the performance when the human performer is not generating sound, a second tailored audio output that makes the respective zones of the group of zones public to allow the noise from the crowd of people of the other zones of the group of zones to be heard in the respective zones, and
during third portions of the performance when the human performer is generating sound, a third tailored audio output and a fourth tailored audio output, wherein the third tailored audio output is provided to a first speaker of a first mobile device of a zone included in the group of zones based on a determination that the first speaker is moving, wherein the fourth tailored audio output is provided to a second speaker of the zone based on the determination that the first speaker is moving, and wherein an aural experience at a second mobile device of the zone remains the same for a duration of the third portions of the performance based on the third tailored audio output and the fourth tailored audio output.

9. The system of claim 8, wherein the tailored audio output is further generated based on an acoustic model of the defined area.

10. The system of claim 8, wherein the tailored audio output is further generated based on constructive interference associated with respective audio outputs of the audio output devices.

11. The system of claim 8, wherein the tailored audio output is further generated based on destructive interference associated with respective audio outputs of the audio output devices.

12. The system of claim 8, wherein the tailored audio output is further generated based on respective locations of the audio output devices in the defined area.

13. The system of claim 8, wherein the operations further comprise selecting, by the system, sizes for the respective zones based on preference data associated with the human performer.

14. The system of claim 8, wherein the operations further comprise selecting, by the system, sizes for the respective zones based on a quantity of user devices associated with the people in the defined area.

15. A non-transitory machine-readable medium, comprising executable instructions that, when executed by a processor, facilitate presentation of operations, comprising:
dividing a defined area comprising a group of individuals into a group of zones; and
generating, via audio output devices, a personalized audio output based on a voice input from a human presenter associated with a presentation being presented to a crowd of individuals in the defined area, wherein the personalized audio output comprises:
during first portions of the presentation when the human presenter is determined to be speaking, a first personalized audio output that makes respective zones of the group of zones private to suppress noise from the crowd of individuals of other zones of the group of zones other than the respective zones,
during second portions of the presentation when the human presenter is determined to be silent, a second personalized audio output that makes at least the respective zones of the group of zones public to allow the noise from the crowd of individuals of the other zones of the group of zones to be heard in the respective zones
during third portions of the presentation when the human presenter is determined to be speaking, a third personalized audio output and a fourth personalized audio output, wherein the third personalized audio output is provided to a first speaker of a first mobile device of a zone included in the group of zones based on a determination that the first speaker is moving, wherein the fourth personalized audio output is provided to a second speaker of the zone based on the determination that the first speaker is moving, and wherein an aural experience at a second mobile device of the zone remains the same for a duration of the third portions of the presentation based on the third personalized audio output and the fourth personalized audio output.

16. The non-transitory machine-readable medium of claim 15, wherein the personalized audio output is further generated based on an acoustic model of the defined area.

17. The non-transitory machine-readable medium of claim 15, wherein the personalized audio output is further generated based on constructive interference associated with respective audio outputs of the audio output devices.

18. The non-transitory machine-readable medium of claim 15, wherein the personalized audio output is further generated based on destructive interference associated with respective audio outputs of the audio output devices.

19. The non-transitory machine-readable medium of claim 15, wherein the operations further comprise selecting sizes for the respective zones based on preference data associated with the human presenter.

20. The non-transitory machine-readable medium of claim 15, wherein the second speaker is part of a third mobile device, wherein the fourth personalized audio output is further based on a determination that the second speaker is moving, and wherein during the third portions of the presentation when the human presenter is determined to be speaking audio signals of the third personalized audio output and the fourth personalized audio output are adjusted so that the aural experience in terms of perceived volume and spatial positioning of sound at the second mobile device matches a predetermined criterion.

* * * * *